July 9, 1929.  G. KALENOFF  1,720,601
COMBINED SPADE AND PLANTER
Filed Oct. 3, 1927
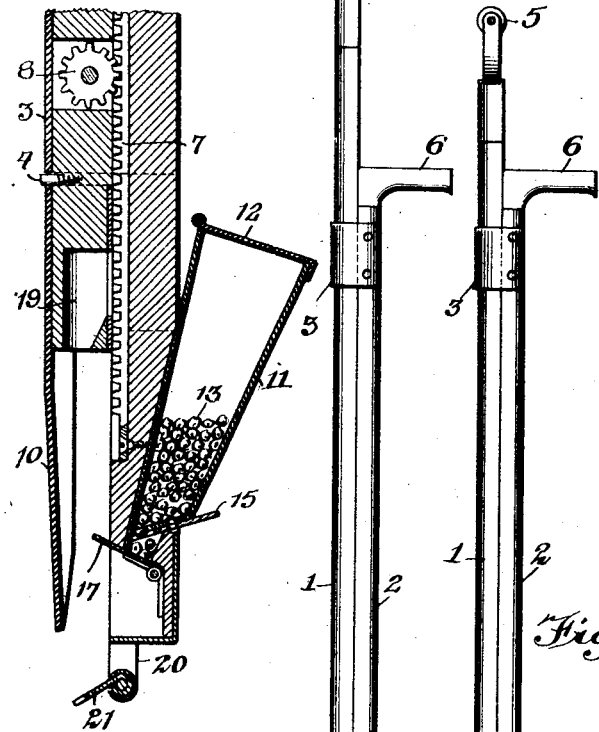
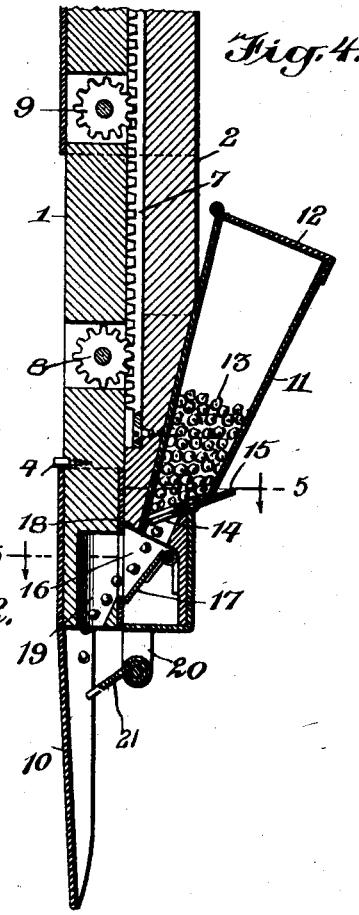
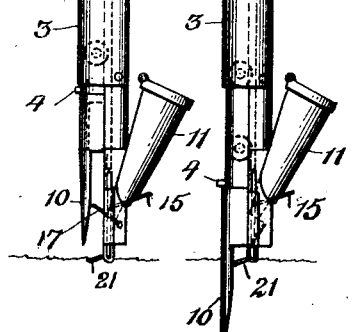
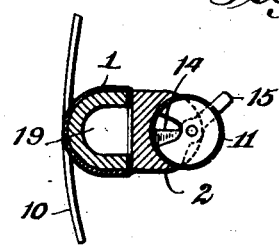
WITNESSES
INVENTOR
Godel Kalenoff
BY
ATTORNEY Patented July 9, 1929.

1,720,601

UNITED STATES PATENT OFFICE.

GODEL KALENOFF, OF BROOKLYN, NEW YORK.

COMBINED SPADE AND PLANTER.

Application filed October 3, 1927. Serial No. 223,779.

This invention relates to a combined spade and planter.

The device is an agricultural implement and it performs the functions of providing a hole in the ground through the medium of a spade or analogous tool, and then drops into the hole the desired number of seeds. For this reason I use the title "Combined spade and planter."

An object of the invention is to provide a portable hand-operated device which can be easily and efficiently operated to plant seed in prepared soil, and permit the performance of this planting operation at a minimum of expenditure of labor and without wastage of the seed.

My invention includes the idea of controlling the number of seeds deposited at each operation, the preparation of a hole in the ground to receive the seed, means for preventing the earth from following the upward movement of the spade, means for controlling the depth of planting, and means for insuring the proper relative movements of the parts so as to give the best results.

With these and other objects in view, the invention consists in certain novel features of construction and combinations and arrangements of parts which will be more fully hereinafter described and pointed out in the claim.

In the accompanying drawings—

Figure 1 is a view in side elevation of my improved device showing the same in position for operation;

Figure 2 is a view similar to Figure 1 showing the spade forced into the ground;

Figure 3 is an enlarged view in longitudinal section showing the lower end of the device with the spade elevated;

Figure 4 is a view similar to Figure 3 showing the spade forced into the ground and the seed dropping from the receptacle;

Figure 5 is a view in transverse section on the line 5—5 of Figure 4.

1 and 2 represent bars, which may be of wood or any other suitable material, one of these bars having metal straps 3 thereon through which the other bar projects to hold the bars in operative relation to each other and permit free sliding movement of one bar relative to the other.

A pin or projection 4 may be provided on bar 1 to engage the lower strap 3 and limit the movement of the bars in one direction, and of course other means might be provided for this purpose.

The bars 1 and 2 are provided at their upper ends with handles 5 and 6, respectively, so that the handle 5 is grasped by one hand and the handle 6 by the other hand to manipulate the device.

To insure a proper sliding action and prevent the contacting surfaces of the bars from frictionally binding, I preferably employ a toothed rack 7 secured to the inner face of the bar 2, with pinions 8 carried by the bar 1 and meshing therewith, but it is of course to be understood that I employ other forms of roller engaging mechanism between the parts without departing from the invention.

On the lower end of the bar 1 a spade 10 is secured and projects beyond the bar, and is of such shape as to form an opening in the soil when pressed into the soil. The bar 2 adjacent its lower end carries a seed receptacle 11 having a movable cover 12 thereon which when opened enables the seed 13 to be deposited in the receptacle.

The lower or outlet end of this receptacle 11 is provided with a cut-off valve 14 which preferably has a handle or finger 15 projecting therefrom, so that by moving this finger or handle the size of the opening or outlet can be controlled in accordance with the size and number of seed desired for each planting operation.

The lower end of the bar 2 is recessed, as shown at 16, and a spring pressed shutter 17 is adapted to seat against a wall 18 of the recess 16 to prevent any dropping of seed. The lower end of the bar 1 is made with a passage 19 through which the seed fall when the parts are in the position shown in Figure 4.

To properly position the tool and prevent it from being forced too far into the ground, I provide a U-shaped foot 20 on the lower end of bar 2 and in this foot I locate a scraper 21 which is adapted to prevent clods of earth from moving upwardly when the spade 10 is elevated.

The operation of the device is as follows: When the parts are in the position shown in Figure 1, the downward movement of bar 1 will cause the spade 10 to enter the ground and provide an opening in the soil. During this downward movement of the bar 1, the end of the bar 1 will engage the end of shutter 17 and move said shutter to open position so that the seed falling from the receptacle 11 will pass through the recess 16 and passage 19 and fall into the opening provided by the spade. When the bar 1 is moved upwardly the shutter 17 will close by reason of its spring action and the device may be moved to position the same for the next operation.

It will therefore be understood that in carrying out the complete operation of providing a hole in the ground and depositing seed therein, it is simply necessary to reciprocate the bar 1 downwardly and then upwardly.

While I have illustrated what I believe to be a preferred embodiment of my invention it is obvious that various changes and alterations might be made in the general form of the parts described without departing from my invention and hence I do not limit myself to the precise details set forth but consider myself at liberty to make such changes and alterations as fairly fall within the spirit and scope of the appended claim.

I claim:

A device of the character described, comprising a stationary bar, a longitudinally movable bar located beside the stationary bar, a spade on the lower end of the movable bar, a seed receptacle on the stationary bar, a shutter controlling the escape of seed from the hopper and opened by engagement of the end of the movable bar therewith, and said movable bar having a recess therein through which the seeds fall when the shutter is opened.

Signed at New York, in the county of New York and State of New York this 1st day of October A. D., 1927.

GODEL KALENOFF.